United States Patent [19]
Walter et al.

[11] Patent Number: 5,476,678
[45] Date of Patent: Dec. 19, 1995

[54] COMPOSITION FOR AND METHOD OF PRODUCING A FIBER FORTIFIED CHEWY OR SOFT-TEXTURED CONFECTION CANDY

[75] Inventors: Dara L. Walter, Ionia, Mich.; Susan E. Linscott, Maplegrove, Minn.

[73] Assignee: Amway Corporation, Ada, Mich.

[21] Appl. No.: 52,389

[22] Filed: Apr. 23, 1993

[51] Int. Cl.[6] .................... A23G 3/00; A23L 1/05; A23L 1/09; A23L 1/29
[52] U.S. Cl. .................... 426/660; 426/572; 426/804
[58] Field of Search ...................... 426/660, 572, 426/804

[56] References Cited

U.S. PATENT DOCUMENTS

| | | |
|---|---|---|
| H847 | 11/1990 | White et al. . |
| 2,429,660 | 10/1947 | Zenzes . |
| 2,538,202 | 1/1951 | Kimball . |
| 2,855,315 | 10/1958 | Perrozzi et al. . |
| 2,976,159 | 3/1961 | Swisher . |
| 3,105,766 | 10/1963 | Barton . |
| 3,159,585 | 12/1964 | Evans et al. . |
| 3,615,671 | 10/1971 | Shoaf et al. . |
| 3,692,542 | 9/1972 | Walon . |
| 3,800,045 | 3/1974 | Brucker et al. . |
| 3,922,354 | 11/1975 | Galluzzi et al. . |
| 4,136,209 | 1/1979 | Fox . |
| 4,205,093 | 5/1980 | Blake . |
| 4,241,092 | 12/1980 | Halik et al. . |
| 4,250,202 | 2/1981 | Hartnett . |
| 4,251,550 | 2/1981 | Proctor . |
| 4,311,722 | 1/1982 | Vink et al. . |
| 4,317,839 | 3/1982 | Mitchell et al. . |
| 4,338,350 | 7/1982 | Chen et al. ........................ 426/658 |
| 4,350,711 | 9/1982 | Kahn et al. . |
| 4,379,171 | 4/1983 | Furda et al. . |
| 4,465,698 | 8/1984 | Bussiere et al. . |
| 4,473,594 | 9/1984 | Miller et al. . |
| 4,496,606 | 1/1985 | Michnowski . |
| 4,543,262 | 9/1985 | Michnowski . |
| 4,564,525 | 1/1986 | Mitchell et al. . |
| 4,565,702 | 1/1986 | Morley et al. . |
| 4,567,055 | 1/1986 | Moore . |
| 4,568,557 | 2/1986 | Becker et al. . |
| 4,585,657 | 4/1986 | Karwowski et al. . |
| 4,605,561 | 8/1986 | Lang . |
| 4,614,654 | 9/1986 | Ream et al. . |
| 4,619,831 | 10/1986 | Sharma . |
| 4,623,543 | 11/1986 | Motegi et al. . |
| 4,656,045 | 4/1987 | Bodor et al. . |
| 4,676,991 | 6/1987 | Batterman et al. . |
| 4,681,766 | 7/1987 | Huzinec et al. . |
| 4,681,770 | 7/1987 | Palmer . |
| 4,698,232 | 10/1987 | Sheu et al. . |
| 4,710,393 | 12/1987 | Holmgren et al. . |
| 4,714,620 | 12/1987 | Bunick et al. ........................ 426/572 |
| 4,737,368 | 4/1988 | Batterman et al. . |
| 4,738,865 | 4/1988 | Morris . |
| 4,832,971 | 5/1989 | Michnowski . |
| 4,859,475 | 8/1989 | Michnowski . |
| 4,871,557 | 10/1989 | Linscott . |
| 4,873,112 | 10/1989 | Mitchell et al. . |
| 4,910,031 | 3/1990 | Budd et al. . |
| 4,911,937 | 3/1990 | Crosello et al. ........................ 426/103 |
| 4,913,919 | 4/1990 | Cornwell et al. . |
| 4,927,654 | 5/1990 | Burnett et al. ........................ 426/548 |
| 4,988,531 | 1/1991 | Moore et al. . |
| 5,009,900 | 4/1991 | Levine et al. . |
| 5,013,574 | 5/1991 | Hassel . |
| 5,084,296 | 1/1992 | Lugay et al. . |
| 5,102,682 | 4/1992 | Nasrallah et al. . |
| 5,124,162 | 6/1992 | Boskovic et al. . |

*Primary Examiner*—Steven Weinstein
*Assistant Examiner*—Curtis E. Sherrer
*Attorney, Agent, or Firm*—Amway Corporation

[57] ABSTRACT

The invention provides a composition for and method of producing a supplemental dietary fiber fortified fructose-based chewy confection which can be stabilized to produce a long textured taffy-like candy or a short textured nougat-like candy, which confection has an acceptable mouthfeel and exhibits a reduced adherence to a consumer's teeth through incorporation of a unique emulsifier blend.

53 Claims, No Drawings

COMPOSITION FOR AND METHOD OF PRODUCING A FIBER FORTIFIED CHEWY OR SOFT-TEXTURED CONFECTION CANDY

BACKGROUND OF THE INVENTION

The present invention relates to a composition for and method of producing a fiber-enhanced confection or snack. More specifically, the present invention relates to a composition for and method of producing a chewy fructose-based confection fortified with supplemental dietary fiber which can be stabilized to produce a long textured taffy-like candy or a short textured nougat-like candy, which candy has an acceptable mouthfeel and exhibits a reduced stickiness on the consumer's teeth through incorporation of a unique combination of mono- and diglycerides.

In keeping with recommendations proposed by leading health authorities, consumers have shown an increasing interest in maintaining a healthy diet which includes consuming higher levels of dietary fiber and reducing the amount of fat. Research on the physiological benefits of fiber have shown that soluble fiber may lower serum cholesterol and help manage blood glucose levels, while insoluble fiber has been found useful in the normalization of bowel function and reduction in the occurrence of colonic diseases. Consumers, however, often find it difficult to meet the recommended daily intake of 25–30 grams of dietary fiber through increased consumption of fruits and vegetables alone. Furthermore, incorporation of supplemental dietary fiber in the diet has been difficult due to the lack of availability of palatable, high fiber, processed foods. Typically, when high amounts of supplemental dietary fiber are added to processed foods, the consumer experiences unacceptable sensory changes in flavor, texture, mouthfeel and general palatability. Prior artisans have encouraged the consumption of fiber by attempting to reduce the objectionable taste of such fiber by incorporating supplemental dietary fiber into products such as cereals, granola bars, puffed snack products and candy-like products. In those instances where supplemental dietary fiber is added, most prior artisans have attempted to resolve the problems of objectionable taste and mouthfeel by enrobing or encapsulating the supplemental dietary fiber with another food grade material.

For example, one such artisan who has incorporated fiber into confectionery products has attempted to solve the aforementioned problems by pretreating the fiber with lubricating materials such as fat and glycerine prior to combining the fiber with the confectionery base. This coating purports to serve the purpose of providing a lubricating and taste masking effect on the fiber. Another artisan who adds fiber to a snack food uses the method of soaking the dietary fiber in a food grade oil before incorporating the fiber into a granola bar. Yet another artisan prepares supplemental dietary fiber for inclusion in products such as snack bars by enrobing insoluble fiber in soluble fiber.

In each of these alternatives, the artisan has attempted to mask the objectionable flavor and textural attributes of the fiber through some type of pretreatment process before the fiber is incorporated into the end product. There are several disadvantages associated with pretreatment using lipids, such as the added time and expense of pretreating the fiber and the resulting high levels of fat in the end product. When fat-enrobed supplemental fiber is used, the product cannot deliver the advantage of both increased fiber content and simultaneous reduction in fat. Therefore, there exists a need for a composition containing supplemental dietary fiber and a reduced fat content which exhibits acceptable organoleptic attributes and a method of producing the same without the additional step of pretreatment and without the addition of lipid materials to the supplemental dietary fiber.

SUMMARY OF THE INVENTION

Briefly stated, the present invention is a supplemental dietary fiber fortified chewy confection and a process for manufacturing the supplemental dietary fiber fortified chewy confection. The supplemental dietary fiber fortified confection is fructose-based and can contain both soluble and insoluble fiber. The confection further contains a unique emulsifier blend which aids in reducing the product's adherence to the consumer's teeth.

Particularly, in one embodiment, the present invention relates to a chewy supplemental dietary fiber fortified taffy confection comprising: 1) a dry blend of confectionery ingredients, 2) an emulsifier comprising a blend of plastic and solid mono- and diglycerides, 3) a fructose-based syrup system which maximizes humectancy and provides seed crystals for grain development, 4) a flavoring, 5) a fortificant, and 6) supplemental dietary fiber of up to 7 grams per ounce (24.7% by weight). In another embodiment, the invention relates to a chewy supplemental dietary fiber fortified nougat confection comprising: 1) a dry blend of confectionery ingredients, 2) an emulsifier comprising a blend of mono- and diglycerides and polyglycerol esters of fatty acids, 3) a fructose-based syrup system, 4) a flavoring, 5) a fortificant, and 6) supplemental dietary fiber of up to 4 grams per ounce (14% by weight). In either of the aforementioned embodiments, juice concentrates and coloring can be added.

The invention also relates to a process of manufacturing a supplemental dietary fiber fortified taffy or nougat confection which involves the addition of a fiber blend of very fine particle size into the fructose-based, low moisture syrup to allow incorporation of the fibers without promoting hydration and an associated increase in viscosity. The method further involves the addition of a dry acid blend of very fine particle size into the fructose-based, low moisture syrup to allow incorporation of the acidulants without solubilization. This process of manufacture minimizes sugar syrup degradation and browning reactions while delivering full flavor impact and smooth texture without an adverse effect on mouthfeel or color.

Additionally, the invention also relates to a method of making a nougat-textured candy without introducing a traditional protein-containing frappe. In this method, aeration is achieved by using a unique blend of pregelatinized starches, mono- and diglycerides and polyglycerol esters of fatty acids.

Both the composition and process of producing the supplemental dietary fiber containing confections of the present invention have several advantages over the related art. The invention uses a high grade spray dried fine particle size gum arabic powder which does not require pretreatment and which contributes a significant level of soluble fiber without adversely impacting texture, mouthfeel, color or flavor. Further, the addition of very fine particle size guar gum and apple pectin adds soluble fiber without negatively impacting texture or sensory qualities. Additionally, the syrup system used in the present invention is designed to minimize moisture loss and textural changes in the end product for an extended period of time and to produce a soft, chewy, low moisture product with a prolonged shelf life.

Additionally, the product delivers a smooth texture and pleasant, sweet fruit flavor with no grittiness or off flavors.

Fructose is an excellent sweetener and humectant, however, its high solubility precludes its use as a primary sweetener in traditional confectionery. Structural integrity of confectionery products is obtained through the controlled crystallization of sucrose, a function which cannot be duplicated by fructose because of its solubility. Fructose-based confections typically exhibit cold flow characteristics. However, in the taffy-like confection of the present invention, stabilization of the flow characteristics is achieved through incorporation of a small amount of micro fine fondant sugar which provides structural integrity and smooth texture without contributing excessive levels of sucrose to the formula. An additional advantage is found with the use of fondant sugar because it does not require solubilization and concentration in the form of a high boil bob syrup. Furthermore, it does not require special mixing to generate a micro crystalline matrix. This allows employment of lower cooking temperatures which minimize browning in the syrup.

Alternately, stabilization can also be achieved through utilization of specialized starches, as was employed in the nougat-like confection of the present invention. This provides the added advantage of producing a candy that does not require sucrose to prevent cold flow, but maintains the attributes of a chewy confection.

While the mono- and diglyceride emulsifiers were originally added to the composition as release aids for the manufacturing and packaging operations, these highly functional fats exhibited the advantage of reducing the product's adherence to the consumer's teeth as well. Because of their highly functional nature, a significant reduction in the level of fat required was also achieved as an added advantage.

In summary, the dry confectionery ingredients, the fortificant and the supplemental dietary fiber blend in combination with the unique syrup system, flavoring and emulsifier blend combine to produce a highly nutritional confection that delivers a significant level of fiber, a reduced fat content, a good flavor, a satisfactory mouthfeel, a smooth texture, a reduced stickiness on the tooth surface and an extended shelf stability when packaged under low moisture conditions.

It is noted that the term "supplemental dietary fiber" as used in this specification and appended claims, is intended to refer to dietary fiber which is added to the ingredients comprising the final product apart from any fiber which may naturally occur as part of the product and is further defined as plant-derived polysaccharides that are not digested by enzymes in the human digestive tract.

It is also noted that, unless otherwise stated, all percentages given in this specification and the appended claims refer to percentages by weight of the finished product.

These and other features and advantages of the present invention will be better understood upon review of the following detailed description of the preferred embodiments.

DETAILED DESCRIPTION OF THE PREFERRED EMBODIMENTS

In one of the preferred embodiments, a chewy fiber fortified taffy confection is made by combining a dry mixture of confectionery ingredients, an emulsifier comprising a blend of plastic and solid mono- and diglycerides, a syrup system comprising fructose, fondant sugar and corn syrup, a flavoring and supplemental dietary fiber so that the dietary fiber content is in the range of up to 7 grams per ounce (24.7% by weight). In the most preferred embodiment the composition for the taffy confection additionally includes juice concentrates, a fortificant and coloring. The dry mixture of confectionery ingredients can be selected from a variety of ingredients known in the art such as maltodextrin, fondant sugar, powdered sugar, cream flavor, organic food acids, yogurt powder and the like and mixtures thereof. In the most preferred embodiment, the dry mixture of confectionery ingredients comprises maltodextrin, fondant sugar, cream flavor and a mixture of organic food acids. The organic food acids are preferably selected from the group consisting of citric acid, malic acid, lactic acid, fumaric acid, tartaric acid and adipic acid, and in the most preferred embodiment are citric acid and malic acid. The taffy confectionery dry mixture preferably ranges from 10.2 to 17% by weight with the dry mixture comprising maltodextrin in an amount up to 10% by weight, fondant sugar in an amount up to 13% by weight, citric acid in an amount up to 2% by weight, malic acid in an amount up to 3% by weight and cream flavor in an amount up to 0.3% by weight. In the most preferred embodiment, the dry mixture comprises 5.56% maltodextrin by weight, 3% fondant sugar by weight, 1.2% citric acid by weight, 0.6% malic acid by weight and 0.22% cream flavor by weight.

In a preferred embodiment, the supplemental dietary fiber fortified taffy confection contains an emulsifier blend from between 2 to 4% by weight with the emulsifier blend comprising a solid mono- and diglyceride in an amount up to 4% by weight and a plastic mono- and diglyceride in an amount up to 4% by weight. In the most preferred embodiment, the emulsifier blend comprises 2.7% solid mono- and diglyceride by weight and 1% plastic mono- and diglyceride by weight. In the most preferred embodiment, the solid mono- and diglyceride has a capillary melting point of between 140°–150° F., at least 40% alpha monoglyceride content and at least 48% total monoglycerides while the said plastic mono- and diglyceride has a capillary melting point of between 113°–120° F. and at least 17% alpha monoglyceride content.

The preferred embodiment of the fiber fortified taffy confection further comprises a syrup system which maximizes humectancy and provides seed crystals for grain development. This syrup system can comprise any of a number of sugars such as fructose, dextrose, lactose, maltose and sucrose, and any of a number of carbohydrate syrups such as corn syrup, honey, molasses, rice syrup, levulose, high fructose corn syrup, high maltose corn syrup and maple syrup. In the most preferred embodiment, corn syrup is used in an amount ranging between 30 to 40% by weight, most preferably 35% by weight, fructose is used in an amount ranging from between 30 to 40% by weight, most preferably between 32.2 and 33.25% by weight and fondant sugar is used in an amount ranging from between 1 to 4% by weight, most preferably 1% by weight. In the most preferred embodiment, the corn syrup has a dextrose equivalent between 42 and 43.

In a preferred embodiment, the supplemental dietary fiber fortified taffy confection contains supplemental dietary fiber in a range between 5 to 30% by weight. The fiber can be any one of various types of dietary fiber and is selected so as not to adversely impact the taste and mouthfeel of the final product. Preferably, a mixture of both soluble and insoluble dietary fiber is used and most preferably a mixture of soluble dietary fibers is used.

Sources of insoluble dietary fiber include, but are not limited to, cereal brans, soy fiber, oat fiber, citrus fiber, corn bran, wheat bran, rice bran, barley bran, rye bran, triticale bran, psyllium seed fiber, cotton seed fiber, cellulose, apple fiber, pea fiber, sugar beet fiber and peanut fiber. In a preferred embodiment the insoluble fiber is chosen from cellulose and oat fiber.

Sources of soluble dietary fiber include, but are not limited to, gum arabic, gum ghatti, guar gum, carboxymethyl cellulose, hydroxypropyl cellulose and hydroxypropyl methylcellulose, konjac mannan, traganath, karaya, locust bean gum, fruit pectin, carrageenan, gellan gum, xanthan gum, propylene glycol alginate, agar and fructooligosaccharides. In a more preferred embodiment of the present invention, the supplemental dietary fiber is selected from a group consisting of gum arabic, guar gum, fruit pectin, carrageenan, locust bean gum, gum ghatti, gellan gum, xanthan gum, propylene glycol alginate, agar and fructooligosaccharides. In the most preferred embodiment of the present invention, gum arabic, guar gum and fruit pectin are used. In a preferred embodiment, the supplemental dietary fiber fortified taffy confection comprises supplemental dietary fiber between 5 to 24% by weight of spray dried powdered gum arabic, most preferably 11% by weight, between 1 to 2% by weight of powdered guar gum, most preferably 1% by weight, and up to 24% by weight of powdered fruit pectin, most preferably 1.5% by weight of fruit pectin which fruit pectin is most preferably high methoxyl apple pectin. Preferably, the fiber used has a fine particle size and most preferably 98% of the guar gum and gum arabic will pass through a #80 U.S. Standard Sieve and at least 50% will pass through a #200 U.S. Standard Sieve, while most preferably 98% of the apple pectin will pass through a #80 U.S. Standard Sieve and 30% of the apple pectin will pass through a #200 U.S. Standard Sieve.

In a preferred embodiment, the fiber fortified taffy confection also comprises juice concentrates at a level of up to 5% by weight, most preferably 2.4% by weight with such juice concentrates having a solids content ranging between 50 to 75% by weight. Any number of juice concentrates can be used, either alone or as a mixture including, but not limited to, citrus fruit juices, orchard fruit juices, berry fruit juices, vine fruit juices, decolorized juices and deflavorized juices. In the most preferred embodiment citrus, vine and orchard fruit juices are used, most preferably cherry juice concentrate, orange juice concentrate, lemon juice concentrate and grape juice concentrate.

In a preferred embodiment, the supplemental dietary fiber fortified taffy confection also contains flavoring between 0.1 and 1.5% by weight. Any number of flavorings can be used including, but not limited to, vanilla flavor, cherry flavor, grape flavor, orange flavor or lemon flavor. In the most preferred embodiment of the cherry fruit chew, 0.1% vanilla flavor and 0.22% cherry flavor is used. In the most preferred embodiment of the grape fruit chew, 0.13% vanilla flavor and 0.3% grape flavor is used. In the most preferred embodiment of the lemon fruit chew 0.1% vanilla favor and 0.25% lemon flavor is used and in the most preferred embodiment of the orange fruit chew 0.13% vanilla flavor and 0.2% orange flavor is used.

The supplemental dietary fiber fortified taffy confection, in a preferred embodiment, also comprises a coloring in an amount ranging from 0.15 to 2% by weight wherein said coloring comes from the group comprising cabbage juice extract color, carrot color, B-carotene color, grape skin extract color or paprika oleoresin color, with the most preferred embodiment containing coloring which will produce an end product resembling individually a cherry fruit chew candy, a grape fruit chew candy, a lemon fruit chew candy or an orange fruit chew candy. In the most preferred embodiment of the cherry fruit chew candy, 0.248% cabbage juice extract and 0.112% paprika oleoresin is used. In the most preferred embodiment of the grape fruit chew candy, 1% grape skin extract is used. In the most preferred embodiment of the lemon fruit chew candy 0.2% carrot color is used and in the most preferred embodiment of the orange fruit chew candy, 0.05% B-carotene and 0.10% paprika oleoresin is used.

It is noted that in any of the preferred embodiments, food supplements such as water soluble vitamins, minerals and the like can be added. Further, in any of the preferred embodiments, ascorbic acid can be added in an amount up to 0.3% by weight, and in the most preferred embodiment, ascorbic acid is added in an amount of 0.19% by weight. It is also noted that particulate materials such as fruits, nuts, confectionery pieces and the like can be added.

In a preferred embodiment of the supplemental dietary fiber fortified nougat confection, the confection is made by combining a dry mixture of confectionery ingredients, an emulsifier comprising a blend of mono- and diglycerides and polyglycerol esters of fatty acids, a syrup system comprising corn syrup and fructose, a flavoring and supplemental dietary fiber so that the supplemental dietary fiber content is up to 4 grams per ounce (14% by weight). In another preferred embodiment, the composition for the nougat confection additionally includes juice concentrates, a fortificant and coloring. The dry mixture of ingredients are selected from the group consisting of modified corn starch, maltodextrin, powdered sugar, yogurt powder, fondant sugar, cream flavor and organic food acids. The organic food acids are preferably selected from the group consisting of citric acid, malic acid, lactic acid, fumaric acid, tartaric acid, and adipic acid. In a preferred embodiment, the confectionery dry mixture ranges from between 10.5 to 13% by weight with the dry mixture comprising modified corn starch in the range of between 2.43 to 3% by weight, corn starch in the range of between 2 to 3% by weight, fondant sugar in the range of between 3 to 13% by weight, citric acid in the amount of up to 3% by weight, malic acid in the amount of up to 3% by weight and cream flavor in the amount of up to 0.3% by weight. In the most preferred embodiment, the dry mixture uses 2.43% modified corn starch, 2% corn starch, 3% fondant sugar, 1.2% citric acid, 0.6% malic acid and 0.22% cream flavor.

A preferred embodiment of the supplemental dietary fiber fortified nougat further comprises an emulsifier blend of solid and plastic mono- and diglycerides and polyglycerol esters of fatty acids in an amount ranging from between 2 to 5% by weight, more preferably such solid mono- and diglycerides range in an amount of up to 4% by weight, most preferably 2.7% by weight, plastic mono- and diglycerides in an amount of up to 4% by weight, most preferably 1% by weight and polyglycerol esters of fatty acids in an amount ranging from 0.2 to 0.5% by weight, most preferably 0.5% by weight.

In a preferred embodiment, the supplemental dietary fiber fortified nougat confection additionally comprises a syrup system of corn syrup in a range of between 30 to 40% by weight, most preferably 35% by weight and fructose in the range of between 30 to 40% by weight, most preferably in an amount ranging from 33.83 to 34.78% by weight.

In a preferred embodiment, the supplemental dietary fiber nougat confection also contains juice concentrate at a level of up to 5% by weight, most preferably 2.4% by weight, wherein said juice concentrates have a solids content ranging between 50 to 75% by weight. Any number of juice concentrates can be used, either alone or as a mixture including, but not limited to, citrus fruit juices, orchard fruit juices, berry fruit juices, vine fruit juices, decolorized fruit juices and deflavorized fruit juices. In the most preferred embodiment, citrus, vine and orchard fruit juices are used, including most preferably cherry juice concentrate, orange juice concentrate, lemon juice concentrate and grape juice concentrate.

In a preferred embodiment of the supplemental dietary fiber fortified nougat confection, the confection contains a flavoring comprising 0.1 to 1.5% by weight. Any number of flavorings can be used including, but not limited to, vanilla flavor, cherry flavor, grape flavor, orange flavor or lemon flavor. In the most preferred embodiments, vanilla, cherry, grape, orange and lemon flavor are used. In the most preferred embodiment of the cherry fruit chew, 0.1% vanilla flavor and 0.22% cherry flavor is used. In the most preferred embodiment of the grape fruit chew, 0.13% vanilla flavor and 0.3% grape flavor is used. In the most preferred embodiment of the lemon fruit chew, 0.1% vanilla favor and 0.25% lemon flavor is used and in the most preferred embodiment of the orange fruit chew, 0.13% vanilla flavor and 0.2% orange flavor is used.

Additionally, in a preferred embodiment, coloring is used in the amount of up to 2% by weight wherein said coloring is selected from the group consisting of cabbage juice extract color, carrot color, B-carotene color, grape skin extract color and paprika oleoresin color, with the most preferred embodiment containing coloring which will produce an end product resembling individually a cherry fruit chew candy, a grape fruit chew candy, a lemon fruit chew candy or an orange fruit chew candy. In the most preferred embodiment of the cherry fruit chew, 0,248% cabbage juice extract and 0.112% paprika oleoresin is used. In the most preferred embodiment of the grape fruit chew, 1% grape skin extract is used. In the most preferred embodiment of the lemon fruit chew, 0.2% carrot color is used and in the most preferred embodiment of the orange fruit chew, 0.05% B-carotene and 0.10% paprika oleoresin is used.

In a preferred embodiment, the supplemental dietary fiber fortified nougat confection contains supplemental dietary fiber in a range from 13.5% to 15% by weight. The fiber can be any one of various types of dietary fiber and is selected so as not to adversely impact the taste and mouthfeel of the final product. Preferably, a mixture of both soluble and insoluble dietary fiber is used and most preferably a mixture of soluble dietary fiber is used.

Sources of insoluble dietary fiber include, but are not limited to, cereal brans, soy fiber, oat fiber, citrus fiber, corn bran, psyllium seed fiber, wheat bran, rice bran, barley bran, rye bran, triticale bran, cotton seed fiber, cellulose, apple fiber, pea fiber, sugar beet fiber and peanut fiber. In a preferred embodiment the insoluble fiber is chosen from the group consisting of cellulose and oat fiber.

Sources of soluble dietary fiber include, but are not limited to, gum arabic, gum ghatti, guar gum, carboxymethyl cellulose, hydroxypropyl cellulose and hydroxypropyl methylcellulose, konjac mannan, traganath, karaya, locust bean gum, fruit pectin, carrageenan, gellan gum, xanthan gum, propylene glycol alginate, agar and fructooligosaccharides. In a more preferred embodiment, the supplemental dietary fiber is selected from the group consisting of gum arabic, guar gum, fruit pectin, carrageenan, locust bean gum, gum ghatti, gellan gum, xanthan gum, propylene glycol alginate, agar and fructooligosaccharides. In a preferred embodiment the supplemental dietary fiber fortified nougat confection comprises supplemental dietary fiber between 5 to 15% by weight of spray dried gum arabic, between 1 to 2% by weight of fine guar gum and up to 15% by weight of fruit pectin. In the most preferred embodiment of the supplemental dietary fiber fortified nougat confection, the supplemental dietary fiber comprises 11% by weight of spray dried powdered gum arabic, 1% by weight of powdered guar gum and 1.5% by weight of powdered fruit pectin which is most preferably high methoxyl apple pectin. Preferably, the fiber used has a fine particle size and most preferably 98% of the guar gum and gum arabic will pass through a #80 U.S. Standard Sieve and at least 50% will pass through a #200 U.S. Standard Sieve, while most preferably 98% of the apple pectin will pass through a #80 U.S. Standard Sieve and 30% of the apple pectin will pass through a #200 U.S. Standard Sieve.

It is noted that in any of the preferred embodiments food supplements such as water soluble vitamins, minerals and the like can be added. Further, in any of the preferred embodiments, ascorbic acid can be added in an amount up to 0.3%, and in the most preferred embodiment, most preferably 0.19% by weight. It is also noted that particulate materials such as fruits, nuts, confectionery pieces and the like can be added.

In accordance with the most preferred embodiment of the method for making a supplemental dietary fiber fortified taffy confection of the present invention, the method includes the steps of first mixing dry confectionery ingredients and then blending the dry confectionery ingredients and fortificants with supplemental dietary fiber to form a homogeneous dry blend; preblending juice concentrates, flavoring and coloring until homogeneous; preparing a sugar syrup comprising corn syrup, fructose and fondant sugar by heating the components in a scraped surface heat exchanger to a temperature ranging between 220°–260° F. (at 1 atm) to reach a moisture content of between 7 to 10%; adding an emulsifier blend to the heated sugar syrup and blending until uniform; cooling said emulsifier blend and sugar syrup to a temperature ranging between 200°–210° F. (at 1 atm); adding the juice blend to the cooled syrup and emulsifier mixture and mixing until uniform to form a candy base; forming a fluid taffy confection by admixing the aforementioned dry blend and the candy base at a temperature ranging between 150°–200° F. and thereafter cooling the fluid taffy confection. The taffy confection can then be prepared as individually wrapped pieces or prepared for a panning operation.

In the most preferred embodiment of the method for making a fiber fortified nougat confection of the present invention, the method includes the steps of first mixing dry confectionery ingredients comprising modified corn starch, corn starch, fondant sugar, cream flavor and organic food acids, and then blending the dry confectionery ingredients with supplemental dietary fiber and fortificants to form a homogeneous dry blend; preblending juice concentrates, flavoring and coloring until homogeneous; preparing a sugar syrup comprising corn syrup and fructose by heating the components in a scraped surface heat exchanger to a temperature ranging between 200°–220° F. (at 1 atm) to reach a moisture content of between 7 to 12%; adding an emulsifier blend to said heated sugar syrup and blending until uniform; cooling said emulsifier blend and sugar syrup to a temperature ranging between 180°–210° F. (at 1 atm); adding the juice blend to the cooled syrup and emulsifier mixture and mixing until uniform to form a candy base; forming a fluid taffy confection by admixing the aforementioned dry blend and the candy base at a temperature ranging between 150°–200° F.; developing a nougat-like texture by aerating said fluid fiber fortified nougat confection by vigorous mixing at a temperature ranging from between 140°–160° F. to obtain a density of between 0.80g/cm³ and 1.15g/cm³. The nougat can then be prepared as individually wrapped pieces, as enrobed bars or prepared for a panning operation.

EXAMPLES

The following examples are provided by way of explanation and description and should not be seen as limiting the scope of the invention. It is to be understood that Examples A, B, C and D respectively represent the most preferred embodiment of the supplemental dietary fiber cherry flavored taffy chew, the supplemental dietary fiber grape flavored taffy chew, the supplemental dietary fiber lemon flavored taffy chew and the supplemental dietary fiber orange flavored taffy chew. Examples E, F, G and H respectively represent the most preferred embodiment of the supplemental dietary fiber cherry flavored nougat chew, the supplemental dietary fiber grape flavored nougat chew, the supplemental dietary fiber lemon flavored nougat chew and the supplemental dietary fiber orange flavored nougat chew.

| Ingredient Name | Cherry % As Is | Grape % As Is | Lemon % As Is | Orange % As Is |
|---|---|---|---|---|
| Examples | A | B | C | D |
| Syrup | | | | |
| Corn Syrup | 35.000 | 35.000 | 35.000 | 35.000 |
| Fructose | 32.950 | 32.200 | 33.080 | 33.150 |
| Fondant Sugar | 1.000 | 1.000 | 1.000 | 1.000 |
| Emulsifiers | | | | |
| Solid Mono- and Diglycerides with Capillary Melting Point of 140–150° F. and Containing at Least 40% Alpha Monoglyceride and 48% Total Monoglycerides | 2.700 | 2.700 | 2.700 | 2.700 |
| Plastic Mono- and Diglycerides with Capillary Melting Point of 113–120° F. and Containing at Least 17% Alpha Monoglycerides | 1.000 | 1.000 | 1.000 | 1.000 |
| Dry Blend | | | | |
| Maltoxdextrin | 5.56 | 5.56 | 5.56 | 5.56 |
| Fondant Sugar | 3.000 | 3.000 | 3.000 | 3.000 |
| Citric Acid | 1.200 | 1.200 | 1.200 | 1.200 |
| Malic Acid | 0.600 | 0.600 | 0.600 | 0.600 |
| Ascorbic Acid | 0.19 | 0.19 | 0.19 | 0.19 |
| Gum Arabic | 11.000 | 11.000 | 11.000 | 11.000 |
| Guar Gum | 1.000 | 1.000 | 1.000 | 1.000 |
| Fruit Pectin | 1.500 | 1.500 | 1.500 | 1.500 |
| Cream Flavor | 0.220 | 0.220 | 0.220 | 0.220 |
| Juice Concentrates | | | | |
| Cherry Juice Conc. | 2.400 | | | |
| Orange Juice Conc. | | | | 2.400 |
| Lemon Juice Conc. | | | 2.400 | |
| Grape Juice Conc. | | 2.400 | | |
| Flavors | | | | |
| Vanilla Flavor | 0.100 | 0.130 | 0.100 | 0.130 |
| Cherry Flavor | 0.220 | | | |
| Grape Flavor | | 0.300 | | |
| Orange Flavor | | | | 0.200 |
| Lemon Flavor | | | 0.250 | |
| Colors | | | | |
| Cabbage Juice Extract | 0.248 | | | |
| Carrot Color | | | 0.200 | |
| B-Carotene - Natural | | | | 0.050 |
| Grape Skin Extract | | 1.000 | | |
| Paprika Oleoresin | 0.112 | | | 0.100 |
| | 100.000 | 100.000 | 100.000 | 100.000 |
| Examples | E | F | G | H |
| Syrup | | | | |
| Corn Syrup | 35.000 | 35.000 | 35.000 | 35.000 |
| Fructose | 34.580 | 33.830 | 34.710 | 34.780 |
| Emulsifiers | | | | |
| Solid Mono- and Diglycerides with Capillary Melting Point of 140–150° F. and Containing at Least 40% Alpha Monoglyceride and 48% Total Monoglycerides | 2.700 | 2.700 | 2.700 | 2.700 |
| Plastic Mono- and Diglycerides with Capillary Melting Point of 113–120° F. and Containing at Least 17% Alpha Monoglycerides | 1.000 | 1.000 | 1.000 | 1.000 |
| Glycerol Esters | 0.500 | 0.500 | 0.500 | 0.500 |
| Dry Blend | | | | |
| Modified Corn Starch | 2.43 | 2.43 | 2.43 | 2.43 |
| Corn Starch | 2.000 | 2.000 | 2.000 | 2.000 |
| Fondant Sugar | 3.000 | 3.000 | 3.000 | 3.000 |
| Citric Acid | 1.200 | 1.200 | 1.200 | 1.200 |
| Malic Acid | 0.600 | 0.600 | 0.600 | 0.600 |
| Ascorbic Acid | 0.19 | 0.19 | 0.19 | 0.19 |
| Gum Arabic | 11.000 | 11.000 | 11.000 | 11.000 |
| Guar Gum | 1.000 | 1.000 | 1.000 | 1.000 |
| Fruit Pectin | 1.500 | 1.500 | 1.500 | 1.500 |
| Cream Flavor | 0.220 | 0.220 | 0.220 | 0.220 |
| Juice Concentrates | | | | |
| Cherry Juice Conc. | 2.400 | | | |
| Orange Juice Conc. | | | | 2.400 |
| Lemon Juice Conc. | | | 2.400 | |
| Grape Juice Conc. | | 2.400 | | |
| Flavors | | | | |
| Vanilla Flavor | 0.100 | 0.130 | 0.100 | 0.130 |
| Cherry Flavor | 0.220 | | | |
| Grape Flavor | | 0.300 | | |
| Orange Flavor | | | | 0.200 |
| Lemon Flavor | | | 0.250 | |
| Colors | | | | |
| Cabbage Juice Extract | 0.248 | | | |
| Carrot Color | | | 0.200 | |
| B-Carotene - Natural | | | | 0.050 |
| Grape Skin Extract | | 1.000 | | |
| Paprika Oleoresin | 0.112 | | | 0.100 |
| | 100.000 | 100.000 | 100.000 | 100.000 |

Of course, it should be understood that wide ranges of changes and modifications can be made to the embodiments described above. It is therefore intended that the foregoing description illustrates rather than limits this invention, and that it is the following claims, including all equivalents, which define this invention.

What is claimed is:

1. A chewy supplemental dietary fiber fortified taffy confection consisting essentially of:

a dry mixture of ingredients selected from the group consisting of maltodextrin, fondant sugar, powdered sugar, cream flavor, organic food acids, and yogurt powder and mixtures thereof;

an emulsifier blend comprising a plastic mono- and diglyceride having a capillary melting point of between 113°–120° F. and at least 17% alpha monoglyceride content and a solid mono- and diglyceride having a capillary melting point of between 140°–150° F., and at least 40% monoglyceride content and at least 48% total monoglycerides content;

a syrup system;

a fortificant;

a flavoring; and uncoated supplemental dietary fiber added to said taffy confection in an amount such that said taffy confection has a total dietary fiber content of between 5% to 30% by weight and wherein said fiber comprises fine particle size guar gum and gum arabic, 98% of which will pass through a #80 U.S. Standard Sieve and at least 50% of which will pass through a #200 U.S. Standard Sieve, and apple pectin 98% of which will pass through a #80 U.S. Standard Sieve and 30% of which will pass through a #200 U.S. Standard Sieve.

2. The supplemental dietary fiber fortified taffy confection of claim 1 wherein said organic food acids are selected from the group consisting of citric acid, malic acid, lactic acid, fumaric acid, tartaric acid and adipic acid.

3. The supplemental dietary fiber fortified taffy confection of claim 1 wherein said dry mixture of ingredients ranges from 10.2 to 17% by weight.

4. The supplemental dietary fiber fortified taffy confection of claim 1 wherein said dry mixture further comprises 5.56% maltodextrin by weight, 3% fondant sugar by weight, 1.2% citric acid by weight, 0.6% malic acid by weight and 0.22% cream flavor by weight.

5. The supplemental dietary fiber fortified taffy confection of claim 1 wherein said emulsifier blend comprises between 2 to 4% by weight.

6. The supplemental dietary fiber fortified taffy confection of claim 1 wherein said emulsifier blend further comprises a solid mono- and diglyceride in an amount up to 4% by weight and a plastic mono- and diglyceride in an amount up to 4% by weight.

7. The supplemental dietary fiber fortified taffy confection of claim 6 wherein said emulsifier blend further comprises 2.7% solid mono- and diglyceride by weight and 1% plastic mono- and diglyceride by weight.

8. The supplemental dietary fiber fortified taffy confection of claim 1 wherein said syrup system is comprised of fructose, fondant sugar and corn syrup.

9. The supplemental dietary fiber fortified taffy confection of claim 8 wherein said syrup system further comprises corn syrup in an amount ranging from between 30 to 40% by weight, fructose in an amount ranging from between 30 to 40% by weight and fondant sugar in an amount ranging from between 1 to 4% by weight.

10. The supplemental dietary fiber fortified taffy confection of claim 8 wherein said syrup system further comprises 35% corn syrup by weight, 1% fondant sugar by weight and between 32.2 and 33.25% fructose by weight.

11. The corn syrup of claim 8 wherein said corn syrup has a dextrose equivalent between 42 and 43.

12. The supplemental dietary fiber fortified taffy confection of claim 1 wherein said flavoring comprises between 0.1 and 1.5% by weight.

13. The supplemental dietary fiber fortified taffy confection of claim 1 wherein said flavoring comprises vanilla flavor, cherry flavor, grape flavor, orange flavor or lemon flavor or a mixture thereof.

14. The supplemental dietary fiber fortified taffy confection of claim 1 wherein said fortificant comprises ascorbic acid in an amount of up to 0.3% by weight.

15. The supplemental dietary fiber fortified taffy confection of claim 1 wherein said fortificant comprises ascorbic acid in an amount of 0.19% by weight.

16. The supplemental dietary fiber fortified taffy confection of claim 1 further comprising a juice concentrate.

17. The supplemental dietary fiber fortified taffy confection of claim 16 wherein said juice concentrate is present at a level of up to 5% by weight.

18. The supplemental dietary fiber fortified taffy confection of claim 16 wherein said juice concentrate comprises concentrates selected from the group consisting of citrus fruit juices, orchard fruit juices, berry fruit juices, vine fruit juices, decolorized juices and deflavored juices.

19. The supplemental dietary fiber fortified taffy confection of claim 16 wherein said juice concentrates comprise 2.4% by weight.

20. The supplemental dietary fiber fortified taffy confection of claim 16 wherein said juice concentrates have a solids content ranging between 50 to 75% by weight.

21. The supplemental dietary fiber fortified taffy confection of claim 16 wherein said juice concentrate is cherry juice concentrate, orange juice concentrate, lemon juice concentrate or grape juice concentrate.

22. The supplemental dietary fiber fortified taffy confection of claim 1 further comprising a coloring.

23. The supplemental dietary fiber fortified taffy confection of claim 22 wherein said coloring is present in the amount ranging from 0.15 to 2% by weight.

24. The supplemental dietary fiber fortified taffy confection of claim 22 wherein said coloring comprises cabbage juice extract color, carrot color, B-carotene color, grape skin extract color or paprika oleoresin color or mixtures thereof.

25. A chewy supplemental dietary fiber fortified nougat confection consisting essentially of:

a dry mixture of ingredients selected from the group consisting of maltodextrin, fondant sugar, powdered sugar, cream flavor, organic food acids, yogurt powder, modified and corn starch and mixtures thereof;

an emulsifier comprising a plastic mono- and diglyceride having a capillary melting point of between 113°–120° F. and at least 17% alpha monoglyceride content, a solid mono- and diglyceride having a capillary melting point of between 140°–150° F., at least 40% monoglyceride content and at least 48% total monoglycerides content, and polyglycerol esters of fatty acids;

a syrup system;

a fortificant;

a flavoring; and uncoated supplemental dietary fiber added to said nougat confection in an amount such that said nougat confection has a total dietary fiber content of between 6% to 32% by weight and wherein said fiber comprises fine particle size guar gum and gum arabic, 98% of which will pass through a #80 U.S. Standard Sieve and at least 50% of which will pass through a #200 U.S. Standard Sieve and apple pectin 98% of which will pass through a #80 U.S. Standard Sieve and 30% of which will pass through a #200 U.S. Standard Sieve.

26. The supplemental dietary fiber fortified nougat confection of claim 25 wherein said organic food acids are selected from the group consisting of citric acid, malic acid, lactic acid, fumaric acid, tartaric acid, and adipic acid.

27. The supplemental dietary fiber fortified nougat confection of claim 25 wherein said dry mixture of ingredients ranges from between 10.5 to 13% by weight.

28. The supplemental dietary fiber fortified nougat confection of claim 25 wherein said dry mixture further comprises modified corn starch in the range of between 2.43 to 3% by weight, corn starch in the range of between 2 to 3% by weight, fondant sugar in the range of between 3 to 13% by weight, citric acid in the amount of up to 3% by weight, malic acid in the amount of up to 3% by weight and cream flavor in the amount of up to 0.3% by weight.

29. The supplemental dietary fiber fortified nougat confection of claim 28 wherein said dry mixture comprises 2.43% modified corn starch, 2% corn starch, 3% fondant sugar, 1.2% citric acid, 0.6% malic acid and 0.22% cream flavor.

30. The supplemental dietary fiber fortified nougat confection of claim 25 wherein said emulsifier blend further comprises from between 2 to 5% by weight.

31. The supplemental dietary fiber fortified nougat confection of claim 25 wherein said emulsifier blend further comprises a solid mono- and diglyceride in an amount of up to 4% by weight and a plastic mono- and diglyceride in an amount of up to 4% by weight and polyglycerol esters of fatty acids in an amount ranging from 0.2 to 0.5% by weight.

32. The supplemental dietary fiber fortified nougat confection of claim 31 wherein said emulsifier blend further comprises 2.7% solid mono- and diglyceride, 1% plastic mono- and diglyceride and 0.5% polyglycerol esters of fatty acids by weight.

33. The supplemental dietary fiber fortified nougat confection of claim 25 wherein said syrup system comprises corn syrup in a range of between 30 to 40% by weight and fructose in the range of between 30 to 40% by weight.

34. The supplemental dietary fiber fortified nougat confection of claim 33 wherein said syrup system comprises corn syrup in an amount of 35% by weight and fructose in an amount ranging from 33.83 to 34.78% by weight.

35. The supplemental dietary fiber fortified nougat confection of claim 25 wherein said flavoring comprises between 0.1 to 1.5% by weight.

36. The supplemental dietary fiber fortified nougat confection of claim 25 wherein said flavoring comprises vanilla flavor, cherry flavor, grape flavor, orange flavor or lemon flavor or a mixture thereof.

37. The supplemental dietary fiber fortified nougat confection of claim 25 further comprising a juice concentrate.

38. The supplemental dietary fiber fortified nougat confection of claim 25 wherein said fortificant comprises ascorbic acid in an amount of up to 0.3% by weight.

39. The supplemental dietary fiber fortified nougat confection of claim 25 wherein said fortificant comprises ascorbic acid in an amount of 0.19% by weight.

40. The supplemental dietary fiber fortified nougat confection of claim 25 further comprising a coloring.

41. The supplemental dietary fiber fortified nougat confection of claim 40 wherein said coloring is present in the amount of up to 2% by weight.

42. The supplemental dietary fiber fortified nougat confection of claim 25 wherein said uncoated supplemental dietary fiber ranges from 13.5 to 15% by weight.

43. A method of making a fiber fortified taffy confection comprising the steps of:

mixing dry ingredients selected from the group consisting of maltodextrin, fondant sugar, powdered sugar, cream flavor, organic food acids, yogurt powder and mixtures thereof;

blending said dry ingredients with a fortificant and uncoated supplemental dietary fiber wherein said fiber comprises fine particle size guar gum and gum arabic 98% of which will pass through a #80 Standard Sieve and at least 50% of which will pass through a #200 U.S. Standard Sieve and apple pectin 98% of which will pass through a #80 U.S. Standard Sieve and 30% of which will pass through a #200 U.S. Standard Sieve to form a homogeneous dry blend;

blending a juice concentrate, a flavoring and a coloring;

mixing a sugar syrup comprising corn syrup, fructose and fondant sugar;

heating said sugar syrup to a temperature ranging between 220°–260° F. to reach a moisture content of between 7 to 10%;

adding an emulsifier blend to said heated sugar syrup and mixing until uniform;

cooling said emulsifier blend and said sugar syrup to a temperature ranging between 200°–210° F.

mixing until uniform said juice concentrate, flavoring and coloring with said cooled emulsifier blend and said sugar syrup mixture to form a candy base;

forming a fluid taffy confection by admixing said dry blend and said candy base at a temperature ranging between 150°–200° F.; and cooling said fluid taffy confection.

44. A supplemental dietary fiber fortified taffy confection produced according to the method of claim 43.

45. The supplemental dietary fiber fortified taffy confection of claim 43 further comprising the step of forming said fluid taffy into individually wrapped pieces.

46. The supplemental dietary fiber fortified taffy confection of claim 43 further comprising the step of preparing said fiber fortified fluid taffy confection for a panning operation.

47. A method of making a supplemental dietary fiber fortified nougat confection comprising the steps of:

mixing dry ingredients selected from the group consisting of maltodextrin, powdered sugar, cream flavor, organic food acids, yogurt powder, modified corn starch, corn starch, fondant sugar and mixtures thereof;

blending said dry ingredients with a fortificant and uncoated supplemental dietary fiber comprising fine particle size guar gum and gum arabic, 98% of which will pass through a #80 U.S. Standard Sieve and at least 50% of which will pass through a #200 U.S. Standard Sieve, and apple pectin 98% of which will pass through a #80 U.S. Standard Sieve and 30% of which will pass through a #200 U.S. Standard Sieve to form a uniform dry blend;

blending a juice concentrate, a flavoring and a coloring;

mixing a sugar syrup comprising corn syrup and fructose;

heating said sugar syrup to a temperature ranging between 200°–220° F. to reach a moisture content of between 7 to 12%;

adding an emulsifier blend to said heated sugar syrup and mixing until uniform;

cooling said emulsifier blend and said sugar syrup to a temperature ranging between 180°–210° F.

mixing until uniform said blend of juice concentrates, said flavoring and said coloring with said cooled emulsifier blend and said sugar syrup mixture to form a candy base;

forming a fluid taffy confection by mixing at a temperature ranging between 150°–200° F. said dry blend and said candy base;

developing a nougat-like texture by aerating said fluid taffy confection by vigorous mixing at a temperature ranging from between 140°–160° F. to attain a bulk density of between 0.80 g/cm$^3$ and 1.15 g/cm$^3$; and cooling said aerated nougat.

48. A supplemental dietary fiber fortified nougat confection produced according to the method of claim 47.

49. The supplemental dietary fiber fortified aerated nougat confection of claim 47 further comprising the step of preparing said supplemental dietary fiber fortified aerated nougat confection for wrapping as individual pieces, for enrobing or for a panning operation.

50. A chewy supplemental dietary fiber fortified taffy confection comprising:

a dry mixture of ingredients comprising maltodextrin in an amount up to 10% by weight, fondant sugar in an amount up to 13% by weight, citric acid in an amount up to 2% by weight, malic acid in an amount up to 3% by weight and cream flavor in an amount up to 0.3% by weight;

an emulsifier blend comprising a solid mono- and diglyceride in an amount up to 4% by weight and a plastic mono- and diglyceride in an amount up to 4% by weight;

a syrup system comprising corn syrup in an amount ranging from between 30 to 40% by weight, fructose in an amount ranging from between 30 to 40% by weight and fondant sugar in an amount ranging from between 1 to 4% by weight;

a fortificant comprising ascorbic acid in an amount of up to 0.3 by weight;

a flavoring comprising between 0.1 and 1.5% by weight; and an untreated supplemental dietary fiber mixture comprising between 5 to 24% by weight of a fine particle size spray dried gum arabic, between 1 to 2% by weight of a fine particle size guar gum and up to 24% by weight of a fine particle size high methoxyl apple pectin wherein at least 98% of said guar gum and said gum arabic will pass through a #80 U.S. Standard Sieve and at least 50% of said guar gum and said gum arabic will pass through a #200 U.S. Standard Sieve and at least 98% of said apple pectin will pass through a #80 U.S. Standard Sieve and at least 30% of said apple pectin will pass through a #200 U.S. Standard Sieve.

51. A chewy supplemental dietary fiber fortified nougat confection comprising:

a dry mixture of ingredients comprising modified corn starch in the range of between 2.43 to 3% by weight, corn starch in the range of between 2 to 3% by weight, fondant sugar in the range of between 3 to 13% by weight, citric acid in the amount of up to 3% by weight, malic acid in the amount of up to 3% by weight and cream flavor in the amount of up to 0.3% by weight;

an emulsifier blend comprising a solid mono- and diglyceride in an amount of up to 4% by weight and a plastic mono- and diglyceride in an amount of up to 4% by weight and polyglycerol esters of fatty acids in an amount ranging from 0.2 to 0.5% by weight;

a syrup system comprising corn syrup in a range of between 30 to 40% by weight and fructose in the range of between 30 to 40% by weight;

a fortificant comprising ascorbic acid in an amount of up to 0.3 by weight;

a flavoring comprising between 0.10 and 1.5% by weight; and an untreated supplemental dietary fiber mixture comprising between 5 to 15% by weight of a fine particle size spray dried gum arabic, between 1 to 2% by weight of a fine particle size guar gum and up to 15% by weight of a fine particle size high methoxyl apple pectin wherein at least 98% of said guar gum and said gum arabic will pass through a #80 U.S. Standard Sieve and at least 50% of said guar gum and said gum arabic will pass through a #200 U.S. Standard Sieve and at least 98% of said apple pectin will pass through a #80 U.S. Standard Sieve and at least 30% of said apple pectin will pass through a #200 U.S. Standard Sieve.

52. A chewy supplemental dietary fiber fortified taffy confection consisting essentially of:

a dry mixture of ingredients selected from the group consisting of maltodextrin, fondant sugar, powdered sugar, cream flavor, organic food acids, and yogurt powder and mixtures thereof;

an emulsifier blend comprising a plastic mono- and diglyceride having a capillary melting point of between 113°–120° F. and at least 17% alpha monoglyceride content and a solid mono- and diglyceride having a capillary melting point of between 140°–150° F., and at least 40% monoglyceride content and at least 48% total monoglycerides content;

a syrup system;

a fortificant;

a flavoring; and uncoated soluble dietary fiber selected from the group consisting of gum arabic, guar gum and apple pectin added to said taffy confection in an amount such that said taffy confection has a total dietary fiber content of between 5% to 30% by weight and wherein said fiber comprises fine particle sizes, 98% of which will pass through a #80 U.S. Standard Sieve and 30% of which will pass through a #200 U.S. Standard Sieve.

53. A chewy supplemental dietary fiber fortified nougat confection consisting essentially of:

a dry mixture of ingredients selected from the group consisting of maltodextrin, fondant sugar, powdered sugar, cream flavor, organic food acids, yogurt powder, modified corn starch, and corn starch and mixtures thereof;

an emulsifier comprising a plastic mono- and diglyceride having a capillary melting point of between 113°–120° F. and at least 17% alpha monoglyceride content, a solid mono- and diglyceride having a capillary melting point of between 140°–150° F., at least 40% monoglyceride content and at least 48% total monoglycerides content, and polyglycerol esters of fatty acids;

a syrup system;

a fortificant;

a flavoring; and uncoated soluble dietary fiber selected from the group consisting of gum arabic, guar gum and apple pectin added to said nougat confection in an amount such that said nougat confection has a total dietary fiber content of between 6% to 32% by weight and wherein said fiber comprises fine particle sizes, 98% of which will pass through a #80 U.S. Standard Sieve and 30% of which will pass through a #200 U.S. Standard Sieve.

* * * * *

UNITED STATES PATENT AND TRADEMARK OFFICE
CERTIFICATE OF CORRECTION

PATENT NO. : 5,476,678

DATED : December 19, 1995

INVENTOR(S) : Dara L. Walter et al.

It is certified that error appears in the above-identified patent and that said Letters Patent is hereby corrected as shown below:

Column 3, line 42;
   After "supplemental dietary fiber" insert --,--.

Column 7, line 33;
   "0,248%" should be --0.248%--.

Column 16, Claim 51, line 13;
   "untreated" should be --uncoated--.

Signed and Sealed this

Second Day of July, 1996

Attest:

BRUCE LEHMAN

Attesting Officer    Commissioner of Patents and Trademarks